(12) United States Patent
Showa et al.

(10) Patent No.: US 8,941,947 B2
(45) Date of Patent: Jan. 27, 2015

(54) SPINDLE MOTOR AND HARD DISK DRIVE THEREWITH

(71) Applicant: Minebea Co., Ltd., Kitasaku-gun, Nagano (JP)

(72) Inventors: Hideaki Showa, Kitasaku-gun (JP); Ryoichi Kurosawa, Saku (JP); Hironobu Tsuge, Kitasaku-gun (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 14/052,022

(22) Filed: Oct. 11, 2013

(65) Prior Publication Data

US 2014/0111884 A1 Apr. 24, 2014

(30) Foreign Application Priority Data

Oct. 19, 2012 (JP) ................................. 2012-232163

(51) Int. Cl.
*G11B 17/02* (2006.01)
*G11B 19/20* (2006.01)
*H02K 21/22* (2006.01)
*H02K 1/14* (2006.01)

(52) U.S. Cl.
CPC ............ *G11B 19/2009* (2013.01); *H02K 21/22* (2013.01); *H02K 1/146* (2013.01); *H02K 2201/09* (2013.01); *H02K 2213/03* (2013.01)
USPC .............. 360/99.08; 360/99.01; 310/216.009; 310/216.044; 310/216.048

(58) Field of Classification Search
USPC ..................... 360/99.08, 97.11; 310/216.004, 310/216.009, 216.013, 216.019, 216.023, 310/216.044, 216.048, 216.066–216.068, 310/216.069, 216.074, 216.111, 216.135
See application file for complete search history.

(56) References Cited

U.S. PATENT DOCUMENTS

| | | | | |
|---|---|---|---|---|
| 5,075,150 | A | * | 12/1991 | Webb et al. .................... 428/162 |
| 5,142,178 | A | * | 8/1992 | Kloster et al. .......... 310/216.048 |
| 5,338,996 | A | * | 8/1994 | Yamamoto ............. 310/216.048 |
| 5,894,182 | A | * | 4/1999 | Saban et al. ........... 310/216.048 |
| 6,223,417 | B1 | * | 5/2001 | Saban et al. .................... 29/598 |
| 8,456,056 | B2 | * | 6/2013 | Sanji et al. ............. 310/216.048 |
| 2002/0096962 | A1 | | 7/2002 | Yoneyama et al. |

FOREIGN PATENT DOCUMENTS

| | | |
|---|---|---|
| JP | A-11-113195 | 4/1999 |
| JP | A-2002-171701 | 6/2002 |

* cited by examiner

*Primary Examiner* — Wayne Young
*Assistant Examiner* — Carlos E Garcia
(74) *Attorney, Agent, or Firm* — Oliff PLC

(57) ABSTRACT

A thin spindle motor having a stator core with sufficient swaging strength even using thin magnetic steel sheets is provided, whereby the magnetic loss and the power consumption of the spindle motor are reduced. The stator core is formed by laminating plural stator laminations with a thickness of 0.1 to 0.2 mm and joined by a swaging portion. The swaging portion has an approximately rectangular shape having long sides extending along a radial direction when viewed from an axial direction. The swaging portion has a cross section with a middle portion parallel to the radial direction and a slope portion at the both sides when viewed from a circumferential direction, thereby forming a recess. The recess has a depth that is less than the thickness of the stator lamination whereby the swaging portion does not cut the stator lamination.

18 Claims, 3 Drawing Sheets

Cross section taken along line X-X

Cross section taken along line X-X

SPINDLE MOTOR AND HARD DISK DRIVE THEREWITH

BACKGROUND OF THE INVENTION

1. Field of the Invention

The present invention relates to a thin spindle motor and a hard disk drive therewith.

2. Description of Related Art

In general, 2.5-inch hard disk drives mounted in notebook computers normally have a thickness of 9.5 mm. Recently, however, thinner hard disk drives with thicknesses of not more than 7 mm have been used in slim notebook computers. Thus, spindle motors for such hard disk drives are also required to be thinner than usual. In addition, notebook computers are also required to consume less electricity.

A stator core of a standard spindle motor has a structure such that stator laminations having teeth portions are formed by press cutting a magnetic steel sheet with a thickness of 0.35 mm, and then a number of stator laminations are laminated and fixed by swaging. If a stator core using the stator laminations with a thickness of 0.35 mm is made thinner than a conventional level, the number of the stator laminations decreases resulting in an increase of the magnetic loss. Thus, it is difficult to reduce both the thickness of the stator core and the power consumption.

Japanese Unexamined Patent Application Laid-Open No. 2002-171701 discloses a technique for forming a core of a spindle motor with a particular thickness by laminating thinnest possible magnetic steel sheets in order to decrease the magnetic loss and the power consumption. It is also disclosed that the core preferably has a structure such that one side of the magnetic steel sheet is recessed so as to project to the other side in order to provide a swaging portion formed of a set of the recess and the projection, and a plurality of the magnetic steel sheets is laminated by swaging the swaging portions.

Japanese Unexamined Patent Application Laid-Open No. 11-113195 discloses a structure of an armature core of a revolving-field type generator. The armature core has teeth portions that are located radially from a shaft center and formed by providing protrusions at an inner circumference thereof. A swaging portion is press cut into a V shape or a trapezoidal shape in the vicinity of a top end portion of each of the teeth portions. In order to provide a laminated structure of plural armature core sheets D1 to Dn, the laminated armature core sheets D1 to Dn are securely engaged with each other by fitting the swaging portions.

SUMMARY OF THE INVENTION

When swaging portions have the shape as disclosed in Japanese Unexamined Patent Application Laid-Open No. 2002-171701, there may be cases in which stator laminations with a thickness of not more than 0.2 mm are not swaged with a sufficient strength to function as a stator core of a spindle motor. The swaging portions, which are press cut into a V shape or a trapezoidal shape as disclosed in Japanese Unexamined Patent Application Laid-Open No. 11-113195, provide a necessary swaging strength. In this case, however, the magnetic flux density is decreased because the magnetic flux does not flow through the press cutting portions. Since the stator core disclosed in Japanese Unexamined Patent Application Laid-Open No. 11-113195 is configured for a generator, the size of the stator core is large and the width of the swaging portions is much smaller than the width of the teeth portions. Therefore, the existence of the press cutting portions hardly causes unfavorable effects in this case. However, since a spindle motor for a hard disk drive is smaller in size, the swaging strength is not sufficiently obtained if the swaging portions are made small compared with the width of the teeth portions. On the other hand, if the swaging portions are enlarged, the press cutting portions also become enlarged and the magnetic flux flows in smaller cross sectional area. Thus, the magnetic loss is increased and the efficiency is decreased, whereby the power consumption is increased. In view of these circumstances, it is an object of the present invention to provide a thin spindle motor and a thin hard disk drive therewith, where the spindle motor uses magnetic steel sheets thinner than conventional levels without compromising the swaging strength and therefore ensuring decreased magnetic loss and reduced power consumption.

A first aspect of the present invention provides a spindle motor including a rotating part, a rotor magnet arranged at the rotating part, and a stator core arranged at a distance from the rotor magnet so as to form a gap in a radial direction therefrom. The stator core includes plural sheet-shaped components made of a magnetic material which are laminated. Each of the sheet-shaped components has an annular body with a circumferential edge that is provided with plural teeth portions to be wound with a coil. The sheet-shaped components are joined by a swaging portion that is formed by recessing one side thereof so as to project to the other side. The sheet-shaped components have a thickness of not less than 0.1 mm and not more than 0.2 mm. The swaging portion has an approximately rectangular shape having short sides in addition to long sides extending along the tooth portion when viewed from an axial direction. The swaging portion has a cross section in a circumferential direction which has a middle portion that is parallel to the radial direction, and a slope portion located between the middle portion and each of the short sides. The recess of the swaging portion has a depth that is less than the thickness of the sheet-shaped component. Thus, the sheet-shaped component is not cut at the swaging portion.

According to the first aspect of the present invention, since the swaging portion is formed by recessing one side of the sheet-shaped component so as to project to the other side, a sufficient swaging strength is obtained even when the sheet-shaped component for the stator core has a thickness of not less than 0.1 mm and not more than 0.2 mm. Moreover, since the swaging portion has a cross section that is formed of a middle portion and a slope portion at each side of the middle portion, the magnetic loss is decreased, whereby low power consumption characteristic is obtained.

According to a second aspect of the present invention, the depth of the recess may be not less than 70% of the thickness of the sheet-shaped component in the first aspect of the present invention. If the depth of the recess is less than the above-described depth, the swaging strength is decreased.

According to a third aspect of the present invention, the swaging portion in the first aspect of the present invention may have a length "b" for the long side and a length "a" for the short side, and the sheet-shaped component may have a thickness "t". In this case, a value of "b/a" is not less than 1.1 when the thickness "t" is greater than 0.15 mm, and the value of "b/a" is not less than a value of (4.7−24t) when the thickness "t" is not less than 0.10 mm and not more than 0.15 mm.

According to a fourth aspect of the present invention, the length "a" in the third aspect of the present invention may be not less than 0.6 mm and not more than 0.8 mm. By setting the above range for the value of "b/a", a necessary swaging strength is obtained.

According to a fifth aspect of the present invention, the rotor magnet in the first aspect of the present invention may have a height of not less than 1.5 mm and not more than 2.5 mm, and the stator core in the first aspect of the present invention may have a height of not less than 0.6 mm and not more than 1.4 mm. In addition, the gap between the rotor magnet and the stator core in the radial direction may be not less than 0.20 mm and not more than 0.25 mm.

According to a sixth aspect of the present invention, the rotor magnet in the first aspect of the present invention may have a height of not less than 1.5 mm and not more than 2.5 mm, and the stator core may have a height that is 40 to 50% of the height of the rotor magnet.

According to a seventh aspect of the present invention, the coil in the first aspect of the present invention may have a wire diameter of not less than 0.10 mm and not more than 0.13 mm and be wound not less than 40 times and not more than 75 times.

According to an eighth aspect of the present invention, the spindle motor in the first aspect of the present invention may have a torque constant of not less than 2.6 mNm/A and not more than 4.6 mNm/A.

According to a ninth aspect of the present invention, a hard disk drive including the spindle motor according to the first aspect of the present invention is provided. The hard disk drive also includes a disk, a head portion, a base for the spindle motor, and a cover. The disk is secured at the rotating part of the spindle motor. The head portion accesses the disk for reading and writing information. The cover forms a sealed space in conjunction with the base for accommodating the spindle motor, the disk, and the head portion.

According to a tenth aspect of the present invention, the hard disk drive in the ninth aspect of the present invention may have a disk with a diameter of 2.5 inches, and a thickness that does not exceed 7 mm when the base and the cover are assembled.

According to the present invention, a thin spindle motor and a thin hard disk drive therewith are provided. The thin spindle motor uses magnetic steel sheets with a thickness smaller than conventional level and includes swaging portions that are securely swaged with a sufficient strength. Thus, the magnetic loss is decreased and the power consumption is reduced.

PREFERRED EMBODIMENTS OF THE INVENTION

General Configuration

Figure 1:
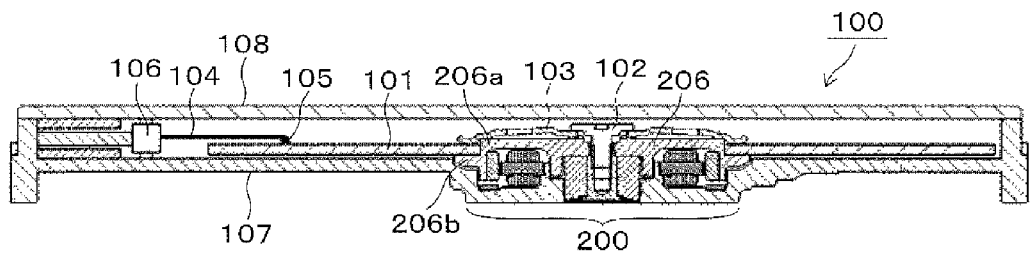
FIG. 1 is a sectional view of an embodiment.

FIG. 1 shows a hard disk drive 100. In this example, the hard disk drive 100 has a thickness of 7 mm and includes a magnetic disk 101, a head portion 105, and a spindle motor part 200, which are accommodated in a clean space sealed by a base 107 and a cover 108. The magnetic disk 101 stores information. The head portion 105 accesses the magnetic disk 101 for reading and writing information. The spindle motor part 200 rotates the magnetic disk 101. The spindle motor part 200 is formed of a stationary part fixed to the base 107, and a rotating part being rotatable with respect to the stationary part via a fluid dynamic pressure bearing assembly.

Figure 2:
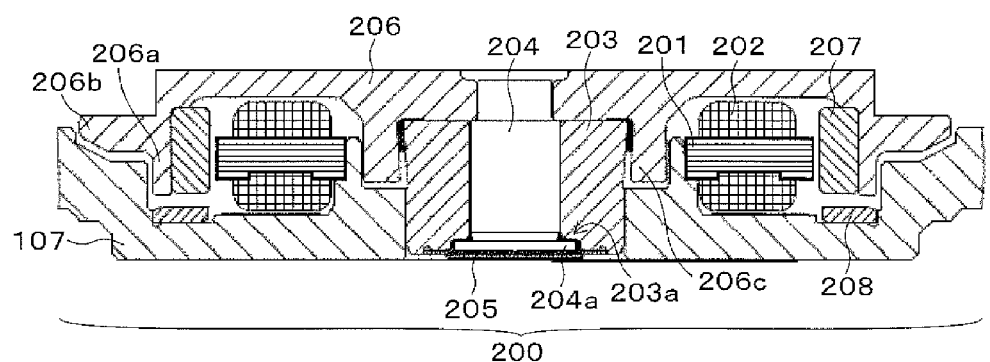
FIG. 2 is a partially enlarged sectional view of the embodiment shown in FIG. 1.

FIG. 2 is a sectional view showing details of the spindle motor part 200 of the present invention. In this case, a spindle motor with a rotatable shaft is illustrated as an example of the present invention, but the present invention also includes a spindle motor with a fixed shaft. The spindle motor part 200 shown in FIG. 2 includes a shaft 204 that functions as a rotational axis. The shaft 204 is rotatably supported by a sleeve 203 via the fluid dynamic pressure bearing assembly.

The shaft 204 has an upper end portion to which a rotor hub 206 is fixed. The rotor hub 206 is a part of rotating part. The rotor hub 206 has a circular top plate and an outer cylindrical wall 206a that is vertically suspended from an outer circumferential edge of the top plate. The outer cylindrical wall 206a has an outer circumferential surface that is provided with a radially projecting disk mounting portion 206b, on which the magnetic disk 101 (see FIG. 1) functioning as an information storage medium is mounted and secured. The upper end portion of the shaft 204 has a center that is provided with a mounting hole, to which a mounting pin 102 is press fitted. The mounting pin 102 allows a mounting component 103 in the form of a leaf spring to press a portion in the vicinity of an inner edge of the magnetic disk 101 to the disk mounting portion 206b, whereby the magnetic disk 101 is secured to the rotor hub 206.

The outer cylindrical wall 206a has an inner circumferential surface on which a circular rotor magnet 207 is fixed. The rotor magnet 207 includes magnetic poles that are magnetized so that the polarity is reversed in the manner of N, S, N, S . . . in the circumferential direction. In this case, the rotor hub 206 is made of a stainless steel, and the rotor magnet 207 does not include a yoke, whereby the number of parts is reduced.

The sleeve 203 has an approximately cylindrical shape and is fixed to the base 107, which is a part of the stationary part. The base 107 includes a stator core 201 that is secured thereto and constructed by laminating stator laminations made of magnetic steel sheet. The stator core 201 is arranged at a position so as to face the rotor magnet 207 separated by a gap in a radial direction. The structure of the stator core 201 will be described in detail later. The stator core 201 is wound with a coil 202 to form a stator, and a wire (not shown in the figures) is led from each of the start and the end of the wiring of the coil 202. The wires pass through a through hole (not shown in the figures) that is provided to the base 107 and are connected with a flexible printed wiring board (not shown in the figures) by soldering. Thus, the coil 202 is supplied with a driving current from a driving circuit (not shown in the figures) via the wires. Then, by switching the driving current, magnetic poles of the stator and magnetic poles of the rotor magnet 207 interact, and the rotor hub 206 rotates with respect to the base 107. In this case, the magnetic poles of the stator are formed of pole teeth of the stator core 201 and the coil 202 that is wound therearound. The pole teeth of the stator core 201 will be described later.

As shown in FIG. 2, the shaft 204 is provided with a retaining flange portion 204a integrally formed at a lower end of the shaft 204. The flange portion 204a has an upper side that faces a step portion 203a provided in the sleeve 203 via a minute gap. The shaft 204 is inserted in a bearing hole of the sleeve 203 and faces an inner circumferential surface of the bearing hole via a minute gap in a radial direction. The inner circumferential surface of the bearing hole includes radial dynamic pressure grooves formed at an upper side and a lower side and separated from each other. The sleeve 203 has an upper end surface that faces a lower end surface of the rotor hub 206 via a minute gap in the axial direction. A thrust dynamic pressure groove is formed on the upper end surface of the sleeve 203. The sleeve 203 has an outer circumferential surface that faces an inner circumferential surface of an inner cylindrical wall 206c of the rotor hub 206. This outer circumferential surface of the sleeve 203 and the inner circumferential surface of the inner cylindrical wall 206c form a tapered seal portion using capillary force to prevent leakage of lubricating fluid.

A counter plate 205 is fixed to a lower end side of the sleeve 203 so as to face the lower surface of the flange portion 204a via a minute gap in the axial direction. The counter plate 205 is fixed by an appropriate means such as welding, adhesive bonding or press fitting. The counter plate 205 seals the lower end side of the sleeve 203. The sleeve 203 includes a communicating hole (not shown in the figures) that is formed at an outer circumference side of the upper end surface so as to communicate with the lower end surface of the sleeve 203 and balance the pressure inside the bearing.

The minute gap in the radial direction including the radial dynamic pressure grooves inside the sleeve 203, the minute gap in the axial direction including the thrust dynamic pressure groove at the upper end surface of the sleeve 203, the communicating hole, and the tapered seal portion are continuously filled with the lubricating fluid. Thus, a radial bearing portion and a thrust bearing portion are formed.

The spindle motor part 200 is configured to stabilize the floating position of the rotating part during rotation by generating a magnetic attractive force for balancing the dynamic pressure because the thrust dynamic pressure groove is formed only on the upper end surface of the sleeve 203. In order to generate the magnetic attractive force, a magnetic attractive plate 208 that is made of a magnetic material is fixed on the base 107 at a position facing a lower end surface of the rotor magnet 207. In addition, the center of the stator core 201 in the axial direction is displaced from the center of the rotor magnet 207 in the axial direction so as to also generate a magnetic attractive force.

The spindle motor part 200 having such a structure is mounted with the magnetic disk 101 as shown in FIG. 1. Moreover, the base 107 is mounted with an arm 104 that includes a head portion 105 for writing and reading information on the magnetic disk 101. The arm 104 is constructed such that the head portion 105 is pivotally movable around a driving portion 106 in an arc in order to swing the head portion 105. The base 107 has a circumferential edge portion with an upper end, on which the cover 108 is mounted so as to seal the hard disk drive 100 from the outside air.

Stator Core Structure

Figure 3:
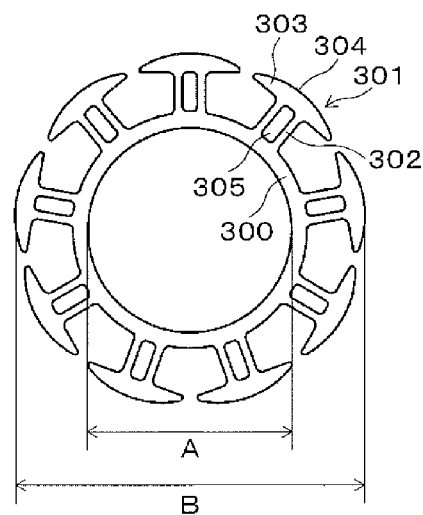
FIG. 3 is a front view of a stator lamination.

The stator core 201 includes plural sheet-shaped magnetic materials in a laminated structure. FIG. 3 shows a front view of a stator lamination 300, which is a sheet-shaped magnetic material for forming the stator core 201 viewed from an axial direction. Since the stator core 201 is formed by laminating plural stator laminations 300 in the axial direction, the stator core 201 has the same shape as shown in FIG. 3 when viewed from the axial direction.

The stator lamination 300 is produced by processing a sheet-shaped magnetic material, such as a magnetic steel sheet, into the shape shown in FIG. 3. The stator lamination 300 has an approximately circular shape and includes plural pole teeth 301 that are arranged around a circumferential edge of the annular body. Each of the pole teeth 301 is an example of a tooth portion and has an extended portion 302 which extends in a direction away from the center of the axis, and a top end portion 303 at a top end portion of the extended portion 302. The top end portion 303 extends in the circumferential direction, and has an outer edge 304 in a curved shape. Thus, the pole teeth 301 have an approximately T shape. While each of the pole teeth 301 is laminated in the axial direction, the extended portions 302 are wound with the coil 202 (see FIG. 2), whereby the magnetic pole of the stator is formed.

Figure 4:
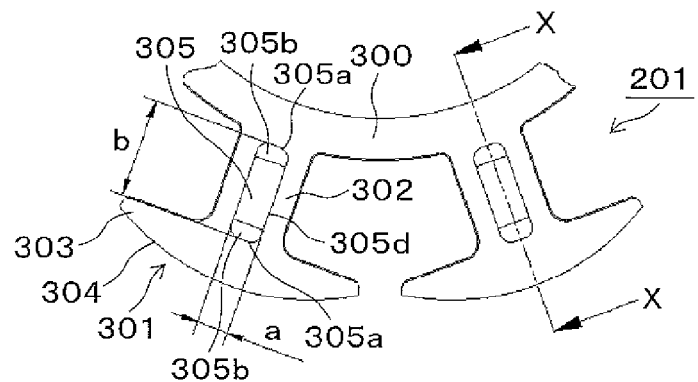
FIG. 4 is a partially enlarged front view of a stator core.
Figure 5:
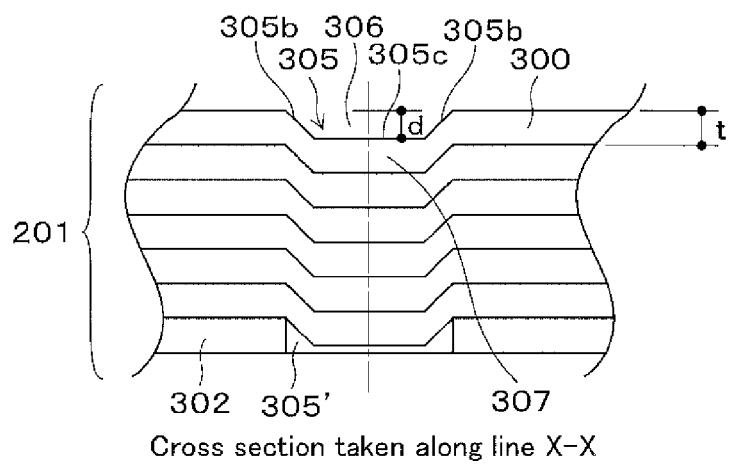
FIG. 5 is a sectional view of a stator core.

The plurality of stator laminations 300 shown in FIG. 3 are laminated and joined by the following structure, whereby the stator core 201 shown in FIG. 2 is formed. FIG. 4 shows a partially enlarged front view of the stator core 201 (formed by laminating the stator laminations 300 in the axial direction) when viewed from the axial direction. FIG. 5 shows a cross section taken along a line X-X in FIG. 4.

As shown in FIG. 5, the stator laminations 300 in the stator core 201 includes a swaging portion 305 which has a recess 306 being recessed in the axial direction, and a projection 307 behind the recess 306. One upper stator lamination 300 and one lower stator lamination 300, which are adjacent to each other in the axial direction, are joined by swaging such that the projection 307 of the upper stator lamination 300 is fitted into the recess 306 of the lower stator lamination 300. Then, the plurality of stator laminations 300 is laminated by repeating this structure. In the example shown in FIG. 5, the stator lamination 300 at the lowest position is formed with a through hole 305' in place of the swaging portion 305. In this case, the projection 307 of the swaging portion 305 of the stator lamination 300 at the second lowest position is fitted into the through hole 305'. Therefore, each of the stator laminations 300 except the one at the lowest position has the swaging portion 305 that is formed by recessing one side thereof so as to project to the other side.

Swaging Portion Structure

The swaging portion 305 shown in FIGS. 3 to 5 will be described in detail hereinafter. The swaging portion 305 has an approximately rectangular shape with round corners when viewed from the axial direction. The swaging portion 305 has long sides 305d that extend along the pole tooth 301. In this example, the long sides 305d of the swaging portion 305 extend along the radial direction of the stator core 201, which passes through the center of the swaging portion, so as not to interfere with the magnetic flux flow. The swaging portion 305 is provided with a slope portion 305b at each side of short sides 305a (see FIG. 4) and includes a flat middle portion 305c between the two slope portions 305b, thereby having an approximately trapezoidal shape when viewed from the circumferential direction (from the viewpoint in FIG. 5). According to this structure, the stator lamination 300 is not cut at the swaging portions 305, and there is no cut portion in the stator lamination 300, whereby the magnetic path is not cut, and the magnetic resistance is not greatly increased. In addition, by providing the slope portions 305b, the magnetic path is not sharply bent, and the increase in the magnetic resistance due to a sharply bent magnetic path is prevented. Moreover, since the four corners at the short sides have an arc shape, the increase in the magnetic resistance due to a sharply bent magnetic path is prevented, and the swaging portions 305 that are adjacent in the axial direction are easily fitted to each other.

The swaging portion 305 has a depth "d" and a thickness "t", and the depth "d" is preferably 70% or more and less than 100% of the thickness "t". If the value of "d" is 100% or more of the value of "t", a gap formed between the pole teeth 301 and the coil 202 is enlarged, whereby the efficiency is greatly decreased.

Figure 6:
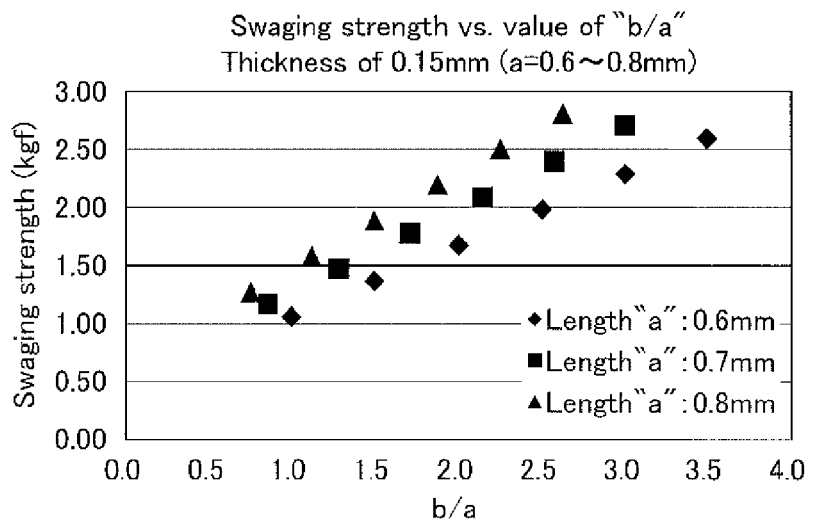
FIG. 6 is a graph showing a relationship between a dimensional ratio of a swaging portion and swaging strength.
Figure 7:
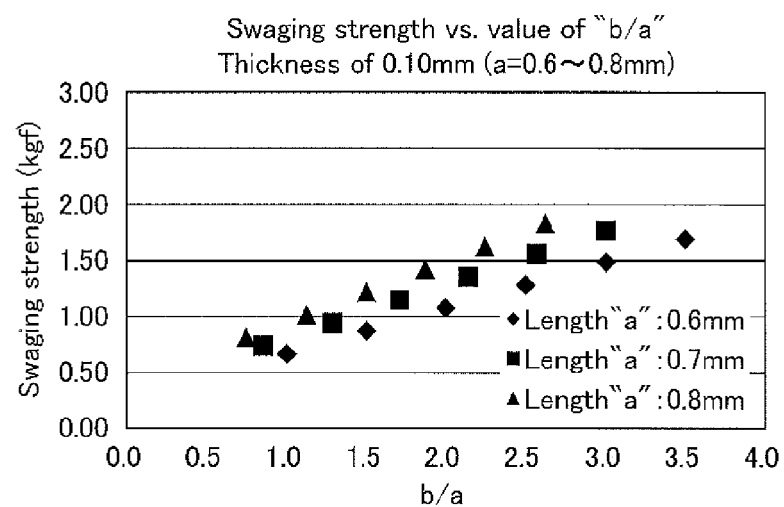
FIG. 7 is a graph showing a relationship between a dimensional ratio of a swaging portion and swaging strength.

FIGS. 6 and 7 are graphs showing relationships between a ratio of a length "b" to a length "a" shown in FIG. 4 and swaging strength when the stator lamination 300 has a thickness "t" of 0.15 mm or 0.10 mm, respectively. In this case, the swaging strength is a power that is necessary to separate the swaged stator laminations. As can be seen in the graphs in FIGS. 6 and 7, in order to obtain swaging strength of not less than 1.5 kgf, the value of "b/a" must be not less than 1.1 when the thickness "t" is 0.15 mm and the length "a" is 0.8 mm, and the value of "b/a" must be not less than 2.3 when the thickness "t" is 0.10 mm and the length "a" is 0.8 mm. For practical purposes, the upper limit of the value of "b/a" is approximately 3.5, or approximately 4 at most.

When the thickness "t" is in a range of 0.10 to 0.15 mm, the lower limit of the value of "b/a", that is, "(b/a)min" is calculated according to the following first formula.

$$(b/a)\min=(4.7-24t) \quad \text{First Formula}$$

The first formula is obtained by linearly interpolating the lower limit of the value of "b/a" between 1.1 and 2.3 when the thickness "t" is in the range of 0.10 to 0.15 mm, based on the data shown in FIGS. 6 and 7. In particular, the first formula is obtained from the following second formula in which the lower limit of the value of "b/a" is interpolated with respect to the thickness "t".

$$2.3-((2.3-1.1)/(0.15-0.1))*(t-0.1)=4.7-24t \quad \text{Second Formula}$$

The swaging portion desirably has long sides that are formed along the radial direction in order to smoothly flow the magnetic flux. In view of this, the value of "b/a" is preferably not less than 1.1 when the thickness "t" is more than 0.15 mm.

Figure 8:
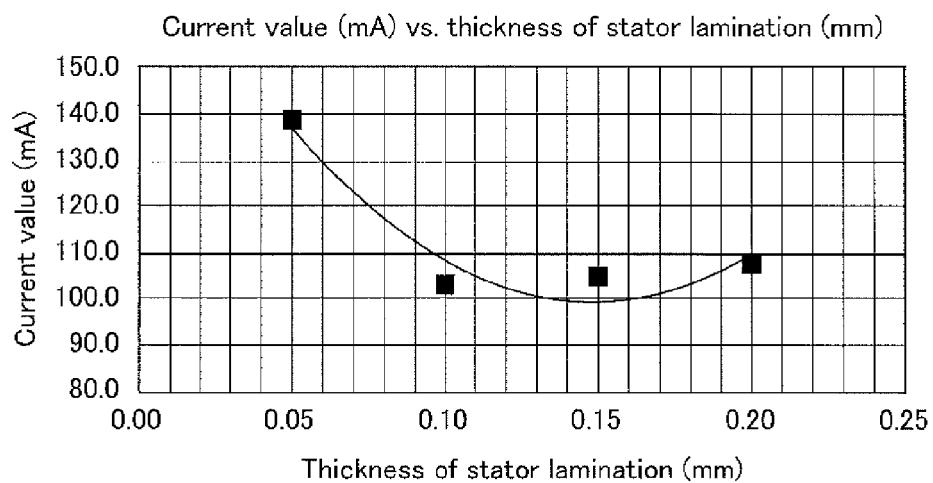
FIG. 8 is a graph showing a relationship between a thickness of a stator lamination and a value of current that flowed during driving.

In general, spindle motors for power-saving thin hard disk drives are required to have a current of not more than 110 mA flowing in a coil when a 2.5-inch disk is mounted and rotated steady at 5400 rpm. By using the spindle motor portion 200 as shown in FIGS. 1 and 2, a relationship between the thickness of the stator lamination 300 and the value of current consumed during driving was measured. The result is shown in the graph in FIG. 8. According to the data shown in FIG. 8, the current value exceeded 110 mA when the thickness was greater than 0.2 mm or less than 0.1 mm. Thus, the thickness of the stator lamination 300 is preferably not less than 0.1 mm and not more than 0.2 mm for decreasing the current value. In particular, the thickness of the stator lamination 300 is more preferably in a range of 0.10 to 0.18 mm because a great effect for reducing the current value is obtained.

Comparative Examples

Samples of 2.5-inch hard disk drives, which had circular swaging portions and had a thickness of 9.5 mm, were prepared as comparative examples. The swaging strength of the stator laminations for a hard disk drive is normally required to be not less than 1.5 kgf. However, in the comparative examples, when the swaging portions had a circular shape with a diameter of 0.6 mm and the stator laminations had a thickness of 0.15 mm or 0.10 mm, the swaging strength was 1.0 kgf or 0.6 kgf, respectively, and the requirement was not satisfied. Even when the diameter of the swaging portions was changed to 0.8 mm, the above-described requirement for the swaging strength was not satisfied.

Specific Examples

Specific examples of specifications of the spindle motor part 200 will be described hereinafter. It should be understood that these specifications are just examples, and the present invention is not limited thereto. The spindle motor part 200 can be used in a hard disk drive with any thickness, but is particularly suitable for a thin hard disk drive that uses a 2.5-inch disk and that has a thickness of not more than 7 mm. This is because the stator core 201 of the spindle motor part 200 has a sufficient swaging strength even when stator laminations 300 with a thickness of not more than 0.2 mm are used. Thus, the hard disk drive can be made thinner and can have lower power consumption at the same time.

The spindle motor part 200 desirably has a torque constant in a range of 2.6 to 4.6 mNm/A. This is because the rotation is not stable when the torque constant is too small, and the power consumption is increased when the torque constant is too high. In order to obtain the torque constant in such a range with low power consumption, the laminated stator core 201 preferably has a height (dimension in the axial direction) of 0.6 to 1.4 mm (more preferably, 0.6 to 1.2 mm). In this case, the coil 202 preferably has a wire diameter of 0.10 to 0.13 mm and is preferably wound 40 to 75 times (more preferably, 60 to 70 times). In addition, the rotor magnet 207 preferably has a height (dimension in the axial direction) of 1.5 to 2.5 mm.

In order to obtain a sufficient amount of the magnetic attractive force, the center of the stator core 201 in the axial direction must be located at a different position from that of the rotor magnet 207. If the height of the rotor magnet 207 is decreased, however, the space for shifting the stator stack (stator core 201) in the axial direction is decreased. Thus, in order to obtain a sufficient amount of the magnetic attractive force, the stator stack (stator core 201) preferably has a height of 40 to 50% of the height of the rotor magnet 207. If the height is not more than 40%, the torque of the motor may be insufficient. In contrast, if the height is not less than 50%, the difference of the center in the axial direction between the stator core 201 and the rotor magnet 207 is decreased, whereby the magnetic attractive force may not be sufficiently obtained.

The gap in the radial direction between the rotor magnet 207 and the stator core 201 is preferably 0.20 to 0.25 mm (more preferably, 0.21 to 0.23 mm). If the gap in the radial direction is increased, noise is decreased. On the other hand, if the gap in the radial direction is excessively increased, a sufficient torque is not obtained. The spindle motor part 200 constructed as described above provides appropriate torque using a small amount of electricity.

For example, a stator core 201 (1.05 mm in height) may be formed by laminating seven stator laminations 300 with a thickness of 0.15 mm. In this case, the coil 202 may have a wire diameter of 0.13 mm wound 66 times. Moreover, the rotor magnet 207 may have a height of 2.4 mm, and the stator stack (stator core 201) may have a height of 44% of the height of the rotor magnet 207. In addition, the gap in the radial direction between the rotor magnet 207 and the stator core 201 may be set to be 0.21 mm. In this case, a spindle motor with a torque constant of 3.9 mNm/A can be obtained.

Advantages

According to the technique described above, a stator core having a sufficient swaging strength is obtained even by using stator laminations that are thinner than usual. Thus, a spindle motor, in which the magnetic loss is decreased and the power consumption is reduced, and a disk drive therewith, are provided. Moreover, the spindle motor can be made thinner and use less electricity by using the stator laminations that are thinner than usual. Accordingly, a thinner spindle motor that is suitable for a hard disk drive with a thickness of not more than 7 mm is provided.

Other Example

As an example for the approximately rectangular shape in which the long sides are arranged along the teeth portion, the long sides may be arranged along linear directions toward the center of the axis (that is, the radial directions) instead of the shape shown in FIG. 4. In this case, the swaging portion 305 will have an approximately rectangular shape which is tapered toward the center of the annular body (the rotational center) when viewed from the axial direction.

The present invention can be utilized for spindle motors and hard disk drives therewith.

What is claimed is:

1. A spindle motor comprising:
a rotating part;
a rotor magnet arranged at the rotating part; and
a stator core arranged at a distance from the rotor magnet so as to form a gap in a radial direction therefrom, the stator core including plural sheet-shaped components made of a magnetic material which are laminated and which have an annular body with a circumferential edge provided with plural teeth portions to be wound with a coil;
wherein the sheet-shaped components are joined by a swaging portion that is formed by recessing one side thereof so as to project to the other side, the sheet-shaped components have a thickness of not less than 0.1 mm and not more than 0.2 mm, the swaging portion when viewed from an axial direction has an approximately rectangular shape with short sides and long sides, the long sides extending along the tooth portion, a cross section of the swaging portion when viewed from a circumferential direction has a middle portion parallel to the radial direction and has a slope portion between the middle portion and each of the short sides, the recess of the swaging portion has a depth that is less than the thickness of the sheet-shaped component whereby the sheet-shaped component is not cut at the swaging portion, and the depth of the recess is not less than 70% of the thickness of the sheet-shaped component.

2. The spindle motor according to claim 1, wherein the swaging portion has a length "b" for the long side and a length "a" for the short side, the sheet-shaped component has a thickness "t", a value of "b/a" is not less than 1.1 when the thickness "t" is more than 0.15 mm, and the value of "b/a" is not less than a value of (4.7−24t) when the thickness "t" is not less than 0.10 mm and not more than 0.15 mm.

3. The spindle motor according to claim 2, wherein the length "a" is not less than 0.6 mm and not more than 0.8 mm.

4. The spindle motor according to claim 1, wherein the rotor magnet has a height of not less than 1.5 mm and not more than 2.5 mm, and the stator core has a height that is 40 to 50% of the height of the rotor magnet.

5. The spindle motor according to claim 1, wherein the spindle motor has a torque constant of not less than 2.6 mNm/A and not more than 4.6 mNm/A.

6. A hard disk drive comprising:
the spindle motor recited in claim 1;
a disk secured at the rotating part of the spindle motor;
a head portion for accessing the disk for reading and writing information;
a base for the spindle motor; and
a cover for forming a sealed space in conjunction with the base for accommodating the spindle motor, the disk, and the head portion.

7. The hard disk drive according to claim 6, wherein the disk has a diameter of 2.5 inches, and a thickness of the hard disk drive does not exceed 7 mm when the base and the cover are assembled.

8. A spindle motor comprising:
a rotating part;
a rotor magnet arranged at the rotating part; and
a stator core arranged at a distance from the rotor magnet so as to form a gap in a radial direction therefrom, the stator core including plural sheet-shaped components made of a magnetic material which are laminated and which have an annular body with a circumferential edge provided with plural teeth portions to be wound with a coil;
wherein the sheet-shaped components are joined by a swaging portion that is formed by recessing one side thereof so as to project to the other side, the sheet-shaped components have a thickness of not less than 0.1 mm and not more than 0.2 mm, the swaging portion when viewed from an axial direction has an approximately rectangular shape with short sides and long sides, the long sides extending along the tooth portion, a cross section of the swaging portion when viewed from a circumferential direction has a middle portion parallel to the radial direction and has a slope portion between the middle portion and each of the short sides, the recess of the swaging portion has a depth that is less than the thickness of the sheet-shaped component whereby the sheet-shaped component is not cut at the swaging portion, wherein the rotor magnet has a height of not less than 1.5 mm and not more than 2.5 mm, the stator core has a height of not less than 0.6 mm and not more than 1.4 mm, and the gap in the radial direction between the rotor magnet and the stator core is not less than 0.20 mm and not more than 0.25 mm.

9. The spindle motor according to claim 8, wherein the swaging portion has a length "b" for the long side and a length "a" for the short side, the sheet-shaped component has a thickness "t", a value of "b/a" is not less than 1.1 when the thickness "t" is more than 0.15 mm, and the value of "b/a" is not less than a value of (4.7−24t) when the thickness "t" is not less than 0.10 mm and not more than 0.15 mm.

10. The spindle motor according to claim 8, wherein the rotor magnet has a height of not less than 1.5 mm and not more than 2.5 mm, and the stator core has a height that is 40 to 50% of the height of the rotor magnet.

11. The spindle motor according to claim 8, wherein the coil has a wire diameter of not less than 0.10 mm and not more than 0.13 mm and is wound not less than 40 times and not more than 75 times.

12. The spindle motor according to claim 8, wherein the spindle motor has a torque constant of not less than 2.6 mNm/A and not more than 4.6 mNm/A.

13. A hard disk drive comprising:
the spindle motor recited in claim 8;
a disk secured at the rotating part of the spindle motor;
a head portion for accessing the disk for reading and writing information;
a base for the spindle motor; and
a cover for forming a sealed space in conjunction with the base for accommodating the spindle motor, the disk, and the head portion.

14. A spindle motor comprising:
a rotating part;
a rotor magnet arranged at the rotating part; and
a stator core arranged at a distance from the rotor magnet so as to form a gap in a radial direction therefrom, the stator core including plural sheet-shaped components made of a magnetic material which are laminated and which have an annular body with a circumferential edge provided with plural teeth portions to be wound with a coil;

wherein the sheet-shaped components are joined by a swaging portion that is formed by recessing one side thereof so as to project to the other side, the sheet-shaped components have a thickness of not less than 0.1 mm and not more than 0.2 mm, the swaging portion when viewed from an axial direction has an approximately rectangular shape with short sides and long sides, the long sides extending along the tooth portion, a cross section of the swaging portion when viewed from a circumferential direction has a middle portion parallel to the radial direction and has a slope portion between the middle portion and each of the short sides, the recess of the swaging portion has a depth that is less than the thickness of the sheet-shaped component whereby the sheet-shaped component is not cut at the swaging portion, wherein the coil has a wire diameter of not less than 0.10 mm and not more than 0.13 mm and is wound not less than 40 times and not more than 75 times.

15. The spindle motor according to claim 14, wherein the swaging portion has a length "b" for the long side and a length "a" for the short side, the sheet-shaped component has a thickness "t", a value of "b/a" is not less than 1.1 when the thickness "t" is more than 0.15 mm, and the value of "b/a" is not less than a value of (4.7−24t) when the thickness "t" is not less than 0.10 mm and not more than 0.15 mm.

16. The spindle motor according to claim 14, wherein the rotor magnet has a height of not less than 1.5 mm and not more than 2.5 mm, and the stator core has a height that is 40 to 50% of the height of the rotor magnet.

17. The spindle motor according to claim 14, wherein the spindle motor has a torque constant of not less than 2.6 mNm/A and not more than 4.6 mNm/A.

18. A hard disk drive comprising:
the spindle motor recited in claim 14;
a disk secured at the rotating part of the spindle motor;
a head portion for accessing the disk for reading and writing information;
a base for the spindle motor; and
a cover for forming a sealed space in conjunction with the base for accommodating the spindle motor, the disk, and the head portion.

* * * * *